(12) United States Patent
Romero-Nochebuena et al.

(10) Patent No.: US 8,946,348 B2
(45) Date of Patent: Feb. 3, 2015

(54) METHOD FOR DISSOLVING POLYVINYL ALCOHOL PARTICLES INTO AQUEOUS MEDIA USING HIGH SHEAR

(75) Inventors: Eduardo Romero-Nochebuena, Pearland, TX (US); Martin Craig Hoofnagle, Peachtree City, GA (US); Jose A. Briones, Flower Mound, TX (US); Emily A. Duff, League City, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 1251 days.

(21) Appl. No.: 11/998,644

(22) Filed: Nov. 30, 2007

(65) Prior Publication Data

US 2009/0143503 A1    Jun. 4, 2009

(51) Int. Cl.
| | |
|---|---|
| *C08L 29/04* | (2006.01) |
| *C08J 3/07* | (2006.01) |
| *C09J 103/02* | (2006.01) |
| *C09J 129/04* | (2006.01) |
| *C08L 3/02* | (2006.01) |

(52) U.S. Cl.
CPC *C08J 3/07* (2013.01); *C09J 103/02* (2013.01); *C09J 129/04* (2013.01); *C08J 2329/04* (2013.01); *C08L 3/02* (2013.01)
USPC ........... 524/557; 524/136; 524/145; 524/156; 524/157; 524/158; 524/160; 524/247; 524/284; 524/300; 524/366; 524/369; 524/375; 524/503; 524/529

(58) Field of Classification Search
USPC ......... 524/145, 156, 157, 247, 366, 503, 557, 524/136, 158, 160, 284, 300, 369, 375, 529
See application file for complete search history.

(56) References Cited

U.S. PATENT DOCUMENTS

| | | | | |
|---|---|---|---|---|
| 3,087,920 | A | * | 4/1963 | Suzumura et al. ............... 525/60 |
| 3,387,405 | A | * | 6/1968 | Iwasyk et al. ...................... 47/9 |
| 4,012,352 | A | * | 3/1977 | Deyrup ......................... 524/557 |
| 4,018,959 | A |   | 4/1977 | Demko et al. ................. 428/182 |
| 4,359,341 | A |   | 11/1982 | Allen ............................. 106/213 |
| 4,366,275 | A |   | 12/1982 | Silano et al. ..................... 524/47 |
| 4,400,480 | A |   | 8/1983 | Silano et al. ..................... 524/47 |
| 4,424,291 | A |   | 1/1984 | Leake et al. ..................... 524/47 |
| 4,568,714 | A |   | 2/1986 | Overholt ......................... 524/25 |
| 4,673,698 | A |   | 6/1987 | Krankkala ....................... 524/47 |
| 4,769,094 | A |   | 9/1988 | Park et al. ..................... 148/403 |
| 4,787,937 | A |   | 11/1988 | Leake ............................ 106/213 |
| 4,912,209 | A |   | 3/1990 | Leake et al. .................. 536/102 |
| 4,978,411 | A |   | 12/1990 | Leake et al. .................. 156/336 |
| 5,057,570 | A |   | 10/1991 | Miller et al. .................. 524/503 |
| 6,414,065 | B1 |   | 7/2002 | Boylan ......................... 524/425 |
| 6,441,076 | B1 |   | 8/2002 | Boylan ......................... 524/425 |
| 6,716,280 | B2 |   | 4/2004 | Atkinson ................... 106/217.2 |

FOREIGN PATENT DOCUMENTS

| | | | | |
|---|---|---|---|---|
| JP | 59066474 | 4/1984 | ................ | C09J 3/14 |
| JP | 11049863 | 2/1999 | ................ | C08J 3/20 |
| JP | 2001009260 | 1/2001 | ................ | B01J 4/00 |
| JP | 2007021357 | 2/2007 | ................ | B01F 5/20 |

OTHER PUBLICATIONS

Database WIPI Week 197518, Thomson Scientific, London, GB; AN 1975-299635W; XP002549544 & JP 50010389 A (Kuraray Co Ltd) Feb. 3, 1975 (abstract).
International Search Report, (2008).

* cited by examiner

*Primary Examiner* — David W Wu
*Assistant Examiner* — Marie Reddick
(74) *Attorney, Agent, or Firm* — M. Ferrell

(57) ABSTRACT

Various processes and methods are disclosed for incorporating polyvinyl alcohol additives into products. In one embodiment, polyvinyl alcohol particles are dissolved in a solvent without the use of external heat to form a polyvinyl alcohol solution for incorporation into a product. In an alternative embodiment, polyvinyl alcohol particles are directly incorporated into a starch-based adhesive composition. Through the processes of the present disclosure, solid polyvinyl alcohol particles can be delivered directly to a manufacturing facility where the product that incorporates the polyvinyl alcohol additive is being made or formulated. In this manner, since the polyvinyl alcohol particles are not predissolved, the costs associated with shipping and transporting the polyvinyl alcohol product are greatly reduced.

32 Claims, 1 Drawing Sheet

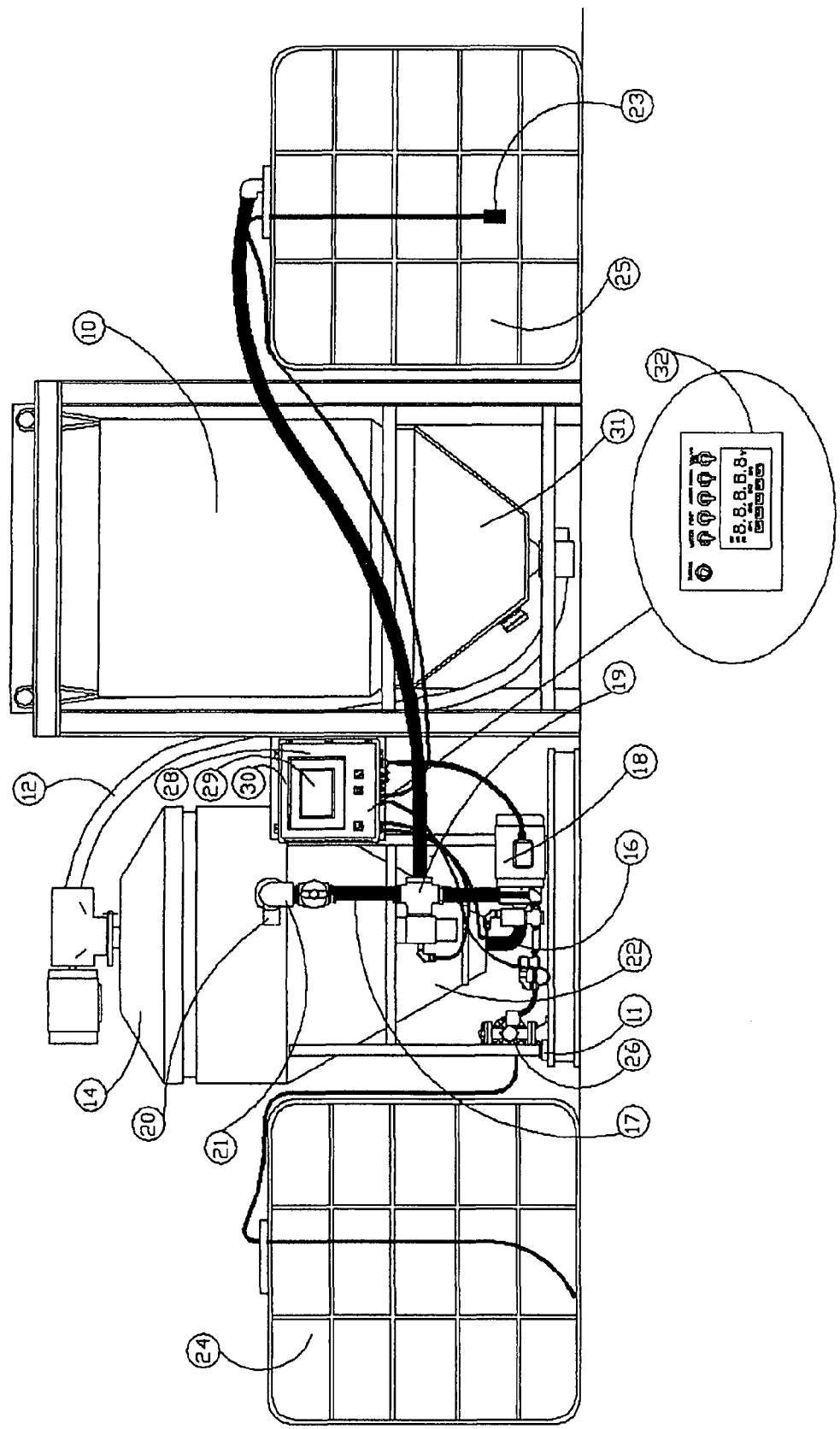

METHOD FOR DISSOLVING POLYVINYL ALCOHOL PARTICLES INTO AQUEOUS MEDIA USING HIGH SHEAR

BACKGROUND

Polyvinyl alcohol is a polyhydroxy polymer having a polyethylene backbone with pendent hydroxyl groups. Polyvinyl alcohol is made by the partial or complete hydrolysis of polyvinyl acetate. During hydrolysis, the acetate groups are removed and replaced with hydroxyl groups.

Polyvinyl alcohol is a very useful polymer that has numerous applications. For instance, polyvinyl alcohol has excellent film forming properties and has excellent emulsifying properties. In addition, polyvinyl alcohol can be used in many different adhesive formulations in order to improve the adhesive properties of the resulting compositions. Of particular advantage, the properties of polyvinyl alcohol can be altered and tailored to a particular application by changing the degree of hydrolysis and/or by adjusting the molecular weight of the polymer.

Polyvinyl alcohol, for instance, is used as an additive in latex paints, paper coatings, hairsprays, shampoos and adhesives. Polyvinyl alcohol is also used as a gas barrier in polymer films, such as polyester films. Polyvinyl alcohol has also been used as a mold release agent, as a film in packaging materials, as a reinforcement additive in construction materials such as concrete, and as an additive in fiberglass.

In many applications, polyvinyl alcohol is incorporated into the product in the form of a solution. For instance, polyvinyl alcohol is typically dissolved in a solvent, such as water, prior to being incorporated into a product. Although polyvinyl alcohol is generally water soluble, problems have been experienced in the past in forming the polymer solutions since the polymer is hard to wet. In addition, the polymer has a tendency to form clumps when combined with various solvents. Thus, in the past, polyvinyl alcohol particles were combined with water in a blend tank under controlled conditions. While being agitated, the mixture of the polyvinyl alcohol particles and the water was typically heated using, for instance, steam sparging or jacket heating to an elevated temperature that assisted in dissolving the solid material.

After being dissolved in a solvent, the resulting polyvinyl alcohol solution was then typically transported to a manufacturing facility for use in various processes. For example, dissolved polyvinyl alcohol is used extensively in formulating starch adhesives. The starch adhesives may, for instance, be used in the construction of corrugated materials.

Pre-dissolving the polyvinyl alcohol particles in water as described above, however, has created various inefficiencies. For instance, the above process for dissolving polyvinyl alcohol particles into a solvent can require significant amounts of energy that adds substantial cost to the product. In addition, transportation inefficiencies are realized in that large amounts of solvent, such as water, are transported with the polyvinyl alcohol product to the manufacturing facility.

In addition to having to transport large amounts of solvent, the containers used to transport the polymer solution also can add significant cost to the product. For example, polyvinyl alcohol solutions are typically transported to manufacturing facilities in two hundred to three hundred gallon totes. Once the totes are used at the manufacturing facility and emptied, the empty totes are then typically transported back to the location where the polymer solutions are formed. Thus, not only the totes themselves are expensive and add cost to the product but transporting the empty totes further creates expenses that must be borne by manufacturers and suppliers.

In view of the above, a need currently exists for improved methods and processes for marketing polyvinyl alcohol additives and for incorporating the additives into useful products.

SUMMARY

The present disclosure is generally directed to various processes and methods for incorporating a polyvinyl alcohol additive into a useful product. For example, in one embodiment, the present disclosure is directed to a process for dissolving polyvinyl alcohol in a solvent without the use of external heat. As used herein, "without the use of external heat" refers to a process by which the solid particles are dissolved in a solvent without heating the solution during mixing absent any heat that may be generated from the mixing process itself. Thus, forming the polyvinyl alcohol solution without any external heat excludes the use of any sort of steam sparging or heating jacket on a mixing tank or mixing line.

In another aspect of the present disclosure, polyvinyl alcohol particles are dissolved in a solvent in the presence of particular dispersants.

In still another embodiment of the present disclosure, polyvinyl alcohol particles are incorporated directly into a product being formulated without being first dissolved in a solvent.

For instance, in one embodiment, the present disclosure is directed to a process for incorporating a polyvinyl alcohol additive into a product that includes the step of batch mixing the polyvinyl alcohol additive with a solvent comprising water. The polyvinyl alcohol additive and the solvent are mixed, such as batch mixed, without adding any external heat. The solvent and the polyvinyl alcohol additive are mixed until the polyvinyl alcohol additive is substantially completely dissolved to form a polyvinyl alcohol solution containing undissolved solids in an amount less than about 5 percent by weight. Mixing can occur, for instance, in the absence of any inorganic insoluble particles.

Once produced, the polyvinyl alcohol solution can then be formulated with a product. Of particular advantage, by not requiring any external heat, the polyvinyl alcohol can be mixed with the solvent at the product manufacturing facility where the product is formulated. In this regard, solid particles of the polyvinyl alcohol additive can be directly transported to the product manufacturing facility for incorporation into the product being formed. Thus, no solvents need to be transported to the product manufacturing facility and the polyvinyl alcohol particles can be packaged in disposable containers, such as bags, without having to transport the product in large totes that, once emptied, have to be transported back to the polyvinyl alcohol producer.

The product that is formed can vary depending upon the particular application. For instance, in one embodiment, the polyvinyl alcohol solution can be incorporated into a starch adhesive. The starch adhesive, for instance, may contain starch in combination with a boron compound, a base, and various other ingredients, such as cross-linking agents and urea.

The polyvinyl alcohol particles that are dissolved in the solvent can vary in particle size, degree of hydrolysis, and molecular weight. For instance, in one embodiment, the polyvinyl alcohol particles may comprise granules having an average particle size from about 200 microns to about 2,500 microns. In an alternative embodiment, the polyvinyl alcohol particles may comprise a powder having an average size of less than about 800 microns, such as less than about 200 microns.

Of particular advantage, partially hydrolyzed polyvinyl alcohol, fully hydrolyzed polyvinyl alcohol and mixtures thereof may be used in the process of the present disclosure. For example, in one embodiment, a partially hydrolyzed polyvinyl alcohol may be used and dissolved in a solvent that is from about 70 mole percent to about 90 mole percent hydrolyzed, such as from about 84 mole percent to about 89 mole percent hydrolyzed. In certain embodiments, partially hydrolyzed polyvinyl alcohols may more rapidly dissolve in the solvent.

In other embodiments, however, polyvinyl alcohols that are hydrolyzed to a greater extent may be used. For instance, polyvinyl alcohols may also be used in the process that has a percent hydrolysis of greater than 90%. In one embodiment, for instance, the polyvinyl alcohol may be from about 91% to about 99.31% hydrolyzed.

The molecular weight of the polyvinyl alcohol used in the process can also vary. In one embodiment, for instance, a lower molecular weight polyvinyl alcohol may be used. For instance, the polyvinyl alcohol may have a viscosity at 4% solids and at 20° C. of less than about 10 cps. For instance, the viscosity of the polyvinyl alcohol at 4% solids and 20° C. can be from about 3.5 cps to about 4.5 cps. In other embodiments, however, higher molecular weight polyvinyl alcohols can be used that have a viscosity at 4% solids and at 20° C. of greater than about 5 cps, such as up to about 75 cps.

The amount of polyvinyl alcohol contained in the solvent can also depend upon various factors including the purpose for which the resulting polyvinyl alcohol solution is to be used. In one embodiment, for instance, the polyvinyl alcohol can be present in the resulting solution in an amount from about 1% to about 60% by weight. In one particular embodiment, for instance, polyvinyl alcohol is present in the solution in an amount from about 10% to about 20% by weight. In an alternative embodiment, polyvinyl alcohol may be present in the resulting solution in an amount from about 20% to about 30% by weight.

The manner in which the polyvinyl alcohol particles and the solvent are mixed together can also vary. In one embodiment, for instance, the solvent and solid particles may be batch mixed by being recirculated through a pumping device. For instance, the solvent and solid particles may be pumped by the pumping device into and out of a mixing tank. The pumping device may comprise a high shear pump or mixer. The solvent and solid particles can be mixed together for less than about 500 minutes, such as less than about 45 minutes, such as less than about 30 minutes, such as even less than about 10 minutes in order to dissolve substantially all of the polyvinyl alcohol.

In one embodiment, the components can be mixed together at a shear rate of greater than about 20/secs, such as greater than about 100/secs, such as greater than about 500/secs. For example, in one embodiment, the shear rate can be greater than about 1000/secs, such as greater than 1500/secs, such as even greater than 2000/secs.

Of particular advantage, the temperature of the solvent that is combined with the polyvinyl alcohol particles can be at ambient temperature or even lower. For instance, the initial temperature of the solvent can be less than about 180° F., such as less than about 110° F., such as less than about 90° F., such as less than about 80° F. and, in one embodiment, even less than about 70° F. As the polyvinyl alcohol particles dissolve in the solvent, the temperature of the solution may increase due to the energy added to the solution during mixing. For most applications, however, the final temperature of the resulting solution after mixing can be less than about 200° F., such as less than about 150° F., such as less than about 110° F., such as even less than about 90° F.

In some embodiments, the polyvinyl alcohol and solvent mixture may be heated using relatively small amounts of energy in order to expedite the dissolving of the particles in the solvent. For instance, in one embodiment, the mixture may be heated to a temperature of less than about 200° F., such as less than about 180° F., such as less than about 160° F., such as less than about 140° F., such as less than about 120° F., such as less than about 100° F.

In another alternative embodiment, the present disclosure is directed to a process for incorporating a polyvinyl alcohol additive into a product by first initially mixing a polyvinyl alcohol additive comprising solid particles with a solvent. The solvent, for instance, may comprise water. In this embodiment, the solvent and polyvinyl alcohol additive are mixed in the presence of a dispersant. The dispersant may comprise, for instance, an acetylenic diol surfactant; poly (oxy-1,2-ethanediyl), a-(nonylphenyl)-w-hydroxy-, branched; tetramethyl-5-decyne-4,7-diol,2,4,7,9-,; butoxyethanol, 2-; alkylarylalkoxylates; ester/styrene maleic anhydride copolymer; ethylene glycol; tetramethyl-5-decyne-4,7-diol,2,4,7,9-,; butoxyethanol, 2-; alkylethoxylates; alkylethersulfates; alkyletherphosphoric acid esters; polyarylalkylphenolethoxylates and phosphate esters; castor oil polyoxyethylene sulfosuccinic acid esters; ethylene oxide/propylene oxide block copolymers; sodium salts of naphthalenesulphonic acid condensation; diethylethanolamine; high molecular weight carboxylic acid salt with an alkyl ammonium; and lower molecular weight unsaturated polycarboxylic acid polymers.

Of particular advantage, the present inventors have discovered that the addition of the dispersant can cause the polyvinyl alcohol particles to more rapidly dissolve without the need for external heat and/or possibly without the need of high shear mixing. In addition, the presence of the dispersant also causes a polyvinyl alcohol additive having a relatively high degree of hydrolysis to dissolve in the solid in a relatively short period of time. For instance, the polyvinyl alcohol additive may be greater than 90 mole percent hydrolyzed, such as even greater than about 96 mole percent hydrolyzed.

Once dissolved in the solvent in the presence of the dispersant, the resulting polyvinyl alcohol solution can then be incorporated into any useful product as desired.

In still another alternative embodiment, the present disclosure is directed to a process for producing a starch adhesive by directly incorporating into the adhesive solid polyvinyl alcohol particles. In this embodiment, a first starch, a boron compound, and a base in a solvent may be first heated together to form a pre-adhesive composition. The pre-adhesive composition, for instance, can be heated to a temperature and for a sufficient amount of time for at least a portion of the starch to gelatinize. In accordance with the present disclosure, after the pre-adhesive composition is formed and heated, a polyvinyl alcohol additive in the form of solid particles may then be added to the pre-adhesive composition. The present inventors have discovered that by adding the polyvinyl alcohol additive after the formation of the pre-adhesive composition, not only does the polyvinyl alcohol additive readily dissolve in the pre-adhesive composition but also does not adversely interact with any of the components in the pre-adhesive composition, such as the boron compound.

After the polyvinyl alcohol additive is added to the pre-adhesive composition or in conjunction with adding the polyvinyl alcohol additive to the pre-adhesive composition, a second starch is also combined with the pre-adhesive composition to form a starch adhesive.

The polyvinyl alcohol additive is combined with the pre-adhesive composition under conditions sufficient for the polyvinyl alcohol to substantially dissolve. For instance, the polyvinyl alcohol additive can be added to the pre-adhesive composition while the composition is being heated and/or being mixed. In one embodiment, for instance, the pre-adhesive composition and the polyvinyl alcohol additive can be mixed together under high shear conditions.

The second starch that is added to the composition is mixed with the composition so that the starch is dispersed throughout the resulting starch adhesive.

Other features and aspects of the present disclosure are discussed in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the following figure:

FIG. 1 is a side view of one embodiment of a system for dissolving polyvinyl alcohol particles in a solvent in accordance with the present disclosure.

Repeat use of reference characters in the present specification and drawings is intended to represent same or analogous features or elements of the disclosure.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to various processes for incorporating a polyvinyl alcohol additive into a useful product. In one embodiment, for instance, the present disclosure is directed to a process by which a polyvinyl alcohol additive can be dissolved in a solvent, such as water, using small amounts of heat or without using any external heat or other complicated process steps or equipment. In this manner, the polyvinyl alcohol additive can be delivered directly to a manufacturing site in solid form and then dissolved in a solvent on site. The resulting polyvinyl alcohol solution can then be incorporated into a product being produced at the manufacturing site. As will be discussed in greater detail below, the polyvinyl alcohol solution can be formed at lower energy costs and without having to transport large quantities of the solvent or large containers to the manufacturing site. In fact, in one embodiment, the solvent can comprise water that is obtained from a water source found on site.

In an alternative embodiment, a polyvinyl alcohol additive in the form of solid particles can be directly added to a product while the product is being formulated or created. For example, in one embodiment, solid particles of polyvinyl alcohol can be incorporated into a starch adhesive while the adhesive is being made. The adhesive can then be used, for instance, to form corrugated materials as will be described in greater detail below.

Referring to FIG. 1, one embodiment of a system for dissolving polyvinyl alcohol particles in a solvent, such as water, is illustrated. As shown, the system includes a solids collection reservoir 10 that is intended to contain a polyvinyl alcohol additive in solid form. The polyvinyl alcohol, for instance, can be contained in bags that are lowered into the collection reservoir 10 and opened.

The solids collection reservoir 10 is in communication with a hopper 31 and an auger 12. The auger 12 may comprise, for instance, a screw or flex auger that is capable of transferring measured amounts of the polyvinyl alcohol solid from the collection reservoir 10 into a mixing tank 14. Within the mixing tank 14, the polyvinyl alcohol particles are combined with a solvent, such as water. For instance, in one embodiment, the mixing tank 14 can be placed in communication with a water source located at the manufacturing site for combining the polyvinyl alcohol with water. The water source, for instance, may comprise well water, tap water, or water obtained as a byproduct from any other process occurring at the manufacturing facility. It should be understood, however, that various other solvents may be used in the process. For instance, the mixing tank 14 may also be filled with an alcohol or any other suitable liquid into which polyvinyl alcohol is dissolvable.

The mixing tank 14 includes an outlet 16 positioned at the bottom of the tank. The outlet 16 is in fluid communication with a pumping device 18. The pumping device pumps a liquid slurry from the mixing tank 14 into a recirculation line 17 which then exits back into the mixing tank 14. In this manner, the polyvinyl alcohol particles and the solvent are batch mixed over a period of time sufficient to substantially dissolve all of the polyvinyl alcohol.

The pumping device 18 that is used to circulate the polyvinyl alcohol solution as it forms can vary depending upon the particular application. Although not critical, in one embodiment, for instance, the pumping device 18 may comprise a pumping device that creates high shear conditions. For instance, the pumping device 18 may comprise a high shear in-line mixer available from Silverson Machines, Inc. Alternatively, the pumping device may comprise a centrifugal pump. Centrifugal pumps are available from numerous commercial sources. In one particular embodiment, for instance, the centrifugal pump may be obtained from Gould Pump. When using a centrifugal pump, for instance, the pump may include an impeller that operates at greater than 1200 rpm, such as greater than 1500 rpm, such as even greater than about 1700 rpm during the batch mixing process. For example, the centrifugal pump may include an impeller that operates at from about 1200 rpm up to about 20,000 rpm.

In some embodiments a pumping device that creates high shear conditions may be used. High shear conditions are defined herein as the process where high energy is provided to a fluid that makes it flow at a high velocity, and a great velocity gradient is produced, dv/dx. The fluid or liquid goes through an intensive hydraulic shear stress resulting in a high sheared material. This type of flow is produced when a liquid is forced to pass small gaps or openings at a high flow, resulting in a great velocity difference between two adjacent fluid layers; thus providing high friction between them that will give the ability to produce solubilization on solids into a solvent, disintegration of solids in a liquid, grinding, emulsifying and homogenization of liquids into a solvent, and preparation of colloidal dispersions, among others.

Different types of equipment may be used to produce high shear, for example, batch mixers, in-line mixers, and the like. All given types of mixers use a rotor and a stator configuration to produce high flow by the use of high centrifugal forces; the rotor rotating at high rpm's, normally above 1000 rpm's to about 10,000 rpm's, produces high radial flow driving the dispersion towards the periphery where the stator is located, then the dispersion is forced to go through the stator perforations at high velocity, producing a great velocity gradient and in consequence a high shear mixing. The tip speed over the gap distance the fluid passes through the stator becomes a important factor to evaluate the amount of shear produced. The tip speed is calculated as follows $$V = \pi D w$$

wherein V =tip speed (cm/sec), D=diameter of rotor (cm, w rotational speed (rev/sec),—π is a factor 3.1416.
The shear rate:

$$\dot{\gamma} = V/g$$

where $\dot{\gamma}$=shear rate (sec$^{-1}$), V =tip speed (cm/sec) and g =opening of the gap (cm).

Typical agitation speeds of the small high shear mixer rotors are from 1000 rpm's to 10,000 rpm's and rotor diameters from about ⅜" to 1". For industrial high shear mixers, agitation speeds are from about 1200 to 4000 rpm's and rotor diameters are from about 4" to about 24". Typical gap openings for lab scale mixers are from about ¹⁄₁₆" to about ⅕", and for industrial scale mixers are from 4" to 24". Typical values of agitation speeds, tip speeds and shears, for high shear devices are in the following table:

| diameter inches | rpm | tip m/sec | speed ft/min | gap inches | Shear 1/sec |
|---|---|---|---|---|---|
| 1 | 3000 | 3.99 | 785.40 | 0.0625 | 209.44 |
| 1 | 10000 | 13.30 | 2618.00 | 0.0625 | 698.13 |
| 1 | 3000 | 3.99 | 785.40 | 0.2500 | 52.36 |
| 1 | 10000 | 13.30 | 2618.00 | 0.2500 | 174.53 |
| 3 | 3000 | 11.97 | 2356.20 | 0.0625 | 628.32 |
| 3 | 10000 | 39.90 | 7854.00 | 0.0625 | 2094.40 |
| 3 | 3000 | 11.97 | 2356.20 | 0.2500 | 157.08 |
| 3 | 10000 | 39.90 | 7854.00 | 0.2500 | 523.60 |
| 4 | 1200 | 6.38 | 1256.64 | 0.3333 | 62.83 |
| 4 | 4000 | 21.28 | 4188.80 | 0.3333 | 209.44 |
| 4 | 1200 | 6.38 | 1256.64 | 1.0000 | 20.94 |
| 4 | 4000 | 21.28 | 4188.80 | 1.0000 | 69.81 |
| 24 | 1200 | 38.30 | 7539.84 | 0.3333 | 376.99 |
| 24 | 1200 | 38.30 | 7539.84 | 1.0000 | 125.66 |

In one embodiment, the pumping device 18 and the mixing tank 14 are sized so that the polyvinyl alcohol particles and solvent remain agitated at all times within the tank. For instance, in one embodiment, the solvent and the polyvinyl alcohol particles may be flowing through the recirculation line 17 at a rate of greater than 150 gpm, such as greater than about 160 gpm, such as even greater than about 170 gpm.

In order to further improve the mixing process, in one embodiment, the system can include a port 21 on the mixing tank 14 which is in communication with an angled nozzle 20. The nozzle 20, for instance, may have a 90° bend relative to the side port 21 or wall of the tank. In this manner, the polyvinyl alcohol and solvent mixture are pumped into the mixing tank at an angle that follows the circumference of the mixing tank. Including the nozzle 20 helps maintain circulation in mixing between the particles and the solvent. In addition, the mixing tank 14 can include a conically shaped bottom portion 22 as shown in FIG. 1. The conically shaped bottom portion 22 in conjunction with the nozzle 20 causes the liquid contained within the mixing tank 14 to swirl and form a vortex as the liquid is being fed to the pumping device 18. The swirling vortex further serves to better mix the different components together and prevents any residue from building on the tank walls.

In one embodiment, the system can further include a Variable Frequency Drive (VFD) 30 to control the speed of the mixer 18. Varying the speed of the mixer 18 controls the size of the vortex in the mixer tank 14 reducing the amount of foam produced in the polyvinyl alcohol solution.

After the polyvinyl alcohol is substantially dissolved within the solvent, the resulting solution as shown in FIG. 1 can be pumped to a tank 25. The tank 25 can then be stored for later use or can be immediately used to feed the polyvinyl alcohol solution into a process at the manufacturing site. In fact, the polyvinyl alcohol solution may be fed directly from the mixing tank 14 into a process for producing a product that utilizes the polyvinyl alcohol additive.

As shown in FIG. 1, the system can also include a second pumping device 26. The second pumping device 26 can be used to pump various other additives or solvents into either the mixing tank 14 or into the holding tank 25. For example, as shown in the figure, the pumping device 26 can be placed in communication with an additive reservoir 24. As shown, the pumping device 26 pumps an additive or solvent from the additive reservoir 24 into the recirculation line 17 for combining an additive or solvent with the polyvinyl alcohol solution. In order to pump controlled amounts of the additive or solvent into the recirculation line 17, the system can include a two position three port actuator valve 19. In one embodiment, the polyvinyl alcohol solution reservoir 25 can include a level float 23 for monitoring levels of the reservoir. The level float 23 via a controller, such as a PLC processor 28, measures the level and can automatically start a solution batch and refill the reservoir.

Various different additives, for instance, may be combined with the polyvinyl alcohol solution depending upon the application for which the polyvinyl alcohol solution is to be used. For instance, in processes for producing starch adhesives using polyvinyl alcohol, additives or solvents that may be combined with the polyvinyl alcohol solution include urea, crosslinking agents, wetting agents, and the like. Crosslinking agents that may be used include, for instance, ketone and aldehyde compounds, such as formaldehyde resins. Such resins can include, for instance, acetone-formaldehyde resins, acetone-urea-formaldehyde resins, acetone-melamine-formaldehyde resins, and the like.

As shown in FIG. 1 and described above, in one embodiment, the system may include a controller 28. The controller 28 may comprise any suitable programmable logic unit, such as a microprocessor. The controller 28, for instance, can be configured to automatically mix measured amounts of the components within the mixing tank 14 and, after a predetermined amount of time, discharge the batch mixed solution to the holding tank 25.

In order to automate the system, the controller 28 may be placed in communication with various measurement and flow rate devices. For example, the mixing tank 14 may include a mechanical or electronic load cell 11 for measuring the amounts of particles being fed to the mixing tank. In addition, the solvent line may include any suitable flow meter that is in communication with the controller 28.

In addition to automated processing, the system as shown in FIG. 1 can also allow for operator changes when desired. For instance, the system can include a human machine interface (HMI) 29 which can include an input panel 32 for use by an operator. The human machine interface 29 may allow variable values to be inputted, changed or set in order to modify the values or properties of the completed polyvinyl alcohol solution.

Of particular advantage, it has been discovered that the process of the present disclosure is capable of dissolving all or substantially all of the polyvinyl alcohol particles in the solvent without the use of external heat. Thus, the mixing tank 14 is not associated with any heating jacket. Further, the recirculation line 17, the outlet 16 or the pumping device 18 do not include any type of heating device for externally heating the solvent and polyvinyl alcohol mixture during recirculation. The temperature of the solution may increase during the process. The temperature increase, however, is due to the amount of energy imparted to the liquid by the pumping device 18.

Also of particular advantage is that the solvent need not be preheated prior to being fed into the mixing tank 14. Thus, through the process of the present disclosure, the polyvinyl alcohol particles can be dissolved in the solvent at ambient temperature or even below without having to add any external heat to the process. For example, the initial temperature of the solvent can be less than about 200° F., such as less than about 150° F., such as less than about 110° F., such as less than about 90° F, such as less than even 80° F. For instance, the initial temperature of the solvent can be from about 55° F. to about 75° F.

After the solvent and the polyvinyl alcohol particles are mixed, the final temperature of the solution can be the same or somewhat higher than the initial temperature of the solvent. For most applications, for instance, the final temperature of the solution can be from about 65° F. to about 200° F. For instance, the final temperature of the solution can be less than about 150° F., such as less than about 110° F., such as less than about 90° F.

In other embodiments, small amounts of energy may be used to heat the mixture as desired depending upon the particular circumstances. The polyvinyl alcohol and solvent mixture, for instance, can be heated to temperatures of less than about 200° F, such as less than about 180° F., such as less than about 160° F, such as less than about 140° F., such as less than about 120° F., such as even less than about 100° F.

The length of time it takes for the polyvinyl alcohol particles to dissolve depends on various factors. For instance, the length of time that the polyvinyl alcohol particles are batch mixed with the solvent can depend upon the initial temperature of the solvent, the size of the polyvinyl alcohol particles, the degree of hydrolysis of the polyvinyl alcohol, the molecular weight and degree of crystallinity of the polymer, the amount of shear during mixing, and aid agents as dispersants. In most applications, for instance, the polyvinyl alcohol particles can be substantially completely dissolved within about 500 minutes, such as less than about 45 minutes, such as less than about 30 minutes, such as less than about 15 minutes. In some applications, the polyvinyl alcohol particles can be dissolved in from about 5 minutes to about 15 minutes.

In most applications, it is desirable to completely or almost completely dissolve all of the polyvinyl alcohol particles in the solvent. In one embodiment, the polyvinyl alcohol particles are dissolved in the solvent so that the resulting solution contains no more than about 5% by weight undissolved solids, such as less than about 3% by weight undissolved solids, such as less than about 1% by weight undissolved solids. Thus, for many applications, it is generally desirable not to combine the solvent and the polyvinyl alcohol particles with other additives that are not dissolvable in the solvent, such as various inorganic particles and fillers. The presence of solids that do not dissolve in the solvent may harm the equipment such as the pumping device or may otherwise adversely interfere with the process.

In general, any suitable polyvinyl alcohol polymer may be dissolved according to the process described above. Typically, polyvinyl alcohol polymers that are partially hydrolyzed and have a lower molecular weight will generally dissolve faster than higher molecular weight polymers and/or polyvinyl alcohol polymers having a higher degree of hydrolysis. In one embodiment, for instance, the polyvinyl alcohol polymer dissolved in the solvent can have a degree of hydrolysis of less than about 90 mole percent. For instance, the degree of hydrolysis of the polyvinyl alcohol polymer can be from about 70 mole percent to about 90 mole percent, such as from about 85 mole percent to about 90 mole percent, and particularly from about 87 mole percent to about 89 mole percent. When using a polyvinyl alcohol polymer having a low molecular weight, the polymer may have a viscosity at 4% solids and at 20° C. of less than about 20 cps, such as from about 3 cps to about 5 cps. As used herein, viscosity refers to Brookfield viscosity using spindle 31 at 30 rpm.

In other embodiments, however, a polyvinyl alcohol polymer having a higher degree of hydrolysis may be used. For instance, the polyvinyl alcohol polymer may have a degree of hydrolysis of greater than 90 mole percent. For instance, in one embodiment, the degree of hydrolysis may be from about 90 mole percent to about 96 mole percent. In still another embodiment, the degree of hydrolysis may be from about 96 mole percent to about 99.3 mole percent or greater.

In certain embodiments, higher molecular weight polyvinyl alcohol particles may also be used. For instance, the polyvinyl alcohol polymer can have a viscosity at 4% solids and at 20° C. of greater than about 5 cps, such as from about 5 cps to about 75 cps.

In addition to molecular weight and degree of hydrolysis, the particle size of the polyvinyl alcohol particles can also vary depending upon the particular application. In general, smaller particles will dissolve faster in the solvent. For instance, in one embodiment, the polyvinyl alcohol particles may have an average particle size of less than about 200 microns.

The present inventors have discovered, however, that larger particles can also be easily dissolved according to the process described above. In this regard, in one embodiment, the polyvinyl alcohol particles are in granular form and have a particle size of from about 200 microns to about 2,500 microns, such as from about 200 microns to about 800 microns.

The amount of polyvinyl alcohol dissolved in the solvent can vary dramatically on the particular application. For example, the amount of polymer dissolved in the solvent will generally depend upon the downstream process for which the solution is to be used and the particular product that is being formulated or made. In some applications, for instance, lower concentrations of polymer are desired, while in other applications higher concentrations may be desired. In one embodiment, for instance, the polyvinyl alcohol particles may be combined with the solvent so that the resulting solution contains the polymer in an amount from about 10% to about 20% by weight, such as from about 15% to about 20% by weight. The above ranges are typically used, for instance, when incorporating a polyvinyl alcohol additive into adhesives, such as starch adhesives.

In other embodiments, however, it may be desirable for the polyvinyl alcohol concentration in the resulting solution to be less than 10%, such as from about 0.5% to about 5% by weight. In still other embodiments, it may be desirable for the concentration of the polymer to be greater than 20%. For instance, polyvinyl alcohol may be present in the solvent in an amount from about 20% by weight up and to saturation. For instance, when higher concentrations are needed, the concentration of polyvinyl alcohol in the solvent can be from about 20% by weight to about 60% by weight, such as from about 25% by weight to about 30% by weight. The upper limit may depend upon the particular solvent used in the process as well as the viscosity and hydrolysis level of the polymer.

Once the polyvinyl alcohol solution has been created in the mixing tank 14, the solution can be used in numerous and diverse applications. For instance, the polyvinyl alcohol solution can be incorporated into any suitable product where the polyvinyl alcohol additive can provide some benefit.

In still another embodiment, the polyvinyl alcohol solution can be incorporated into an adhesive for improving the adhesive properties of the composition. In one particular embodiment, for instance, the polyvinyl alcohol solution can be incorporated into a starch adhesive. Starch adhesives, for instance, typically incorporate a polyvinyl alcohol additive. The polyvinyl alcohol polymer, once present in the adhesive, can improve the adhesive properties of the product.

In one particular embodiment, for instance, the starch-based adhesive incorporating the polyvinyl alcohol solution can be used as a corrugating adhesive for making corrugation products.

Corrugation products, such as boxes and other packaging materials, are made from a laminated structure containing an alternating arrangement of flat paper facings bonded to fluted paper members. In constructing the laminates, a starch-based corrugating adhesive is typically applied to the protruding tips of the fluted paper members. For instance, the equipment used to make the corrugated boards can include glue applicators that apply the starch-based adhesive to the fluted members. The fluted members are then brought into contact with a facing layer under the influence of heat and pressure. This process can then be repeated over and over to prepare a laminate having the desired strength.

Starch-based adhesives are typically prepared by cooking starch in an aqueous solution that may contain a base, such as an alkali metal hydroxide. The starch is cooked, for instance, at a temperature of from about 95° F. to about 120° F. until at least a portion of the starch gelatinizes. The base combined with the starch can lower the gel point of the starch and increase the rate of hydration of the starch during curing.

The starch-based adhesive can also contain various other components. For instance, a boron compound may be added during the cooking process which aids in gelling the starch molecules. The boron compound may comprise any suitable boric acid and/or borax. Borax is also known as sodium tetraborate decahydrate. One suitable boric acid that may be used is orthoboric acid.

In addition to a boron compound, the starch adhesive may also include a crosslinking resin and/or a wax. Crosslinking resins that may be used include ketone and aldehyde compounds. Examples of resins, for instance, include acetone-formaldehyde resins, acetone-urea-formaldehyde resins, or acetone-melamine-formaldehyde resins.

Waxes that may be incorporated into the starch adhesive can include natural and synthetic waxes. Examples include petroleum waxes, candelilla wax, beeswax, including microcrystalline waxes, slack waxes and paraffin waxes.

In accordance with the present disclosure, the starch adhesive may also contain the polyvinyl alcohol solution. When incorporated into a starch adhesive, polyvinyl alcohol can improve many properties, including the bond strength, of the resulting composition.

For exemplary purposes only, for instance, a starch-based adhesive can be formulated that contains starch in an amount from about 10% to about 50% by weight, a base (such as caustic soda) in an amount from about 0.001% to about 1% by weight, a boron compound in an amount from about 0.002% by weight to about 1% by weight, a crosslinking resin in an amount from about 0% to about 30% by weight, and a wax in an amount from about 0% to about 50% by weight. In addition, urea can also be incorporated into the formulation. When present, urea can be added in an amount from about 1% to about 15% by weight.

The above quantities, however, are merely exemplary. Various formulations for making starch adhesives are disclosed, for instance, in U.S. Pat. Nos. 4,978,411, 4,912,209, 4,787,937, 4,769,094, 4,568,714, 4,424,291, 4,400,480, 4,366,275, 4,359,341, 4,018,959, 4,673,698, and 6,716,280 which are all incorporated herein by reference.

It should be understood that the system illustrated in FIG. 1 represents merely one embodiment of a system and process that may be used to dissolve polyvinyl alcohol particles in a solvent in accordance with the present disclosure. For example, in an alternative embodiment, a dispersant may be used in order to facilitate the dissolving of the polyvinyl alcohol particles into the solvent. When using a dispersant in accordance with the present disclosure, for instance, in some applications, a pumping device, such as a high shear pumping device may not be needed. In addition, instead of a batch process as shown in FIG. 1, the use of a dispersant may allow for an inline mixing process where the dispersant, the polyvinyl alcohol particles, and the solvent are mixed inline and fed directly to either a storage tank or to a process. When conducted in a batch process, instead of a recirculation line in communication with a pump, the mixing tank may simply include a mixing device that agitates the solvent and the particles in the presence of the dispersant.

For example, in one embodiment, the dispersant that may be used in the process is an acetylenic diol surfactant. For instance, in one particular embodiment, the acetylenic diol surfactant may include a non-ionic component and an anionic component. In particular, the surfactant may comprise a mixture of from about 20% to about 50% of alpha-(nonphenyl)-omega-hydroxy-branched poly(oxy-1,2-ethane diyl) combined with from about 2% to about 10% by weight 2,4,7,9-tetramethyl-5-decyne-4,7-diol-ethoxylate. Such surfactants, for instance, are commercially available from Air Products under the trade name SURFYNOL.

In other embodiments, the dispersant may comprise:

| Chemistry | Trade Name |
|---|---|
| Poly(oxy-1,2-ethanediyl), a-(nonylphenyl)-w-hydroxy-, branched | SURFYNOL CT-131 ™ (a proprietary dispersant containing Poly(oxy-1,2-ethandiyl,a-(nonylphenyl)-w-hydroxy and Tetramethyl-5-decyne-4,7-diol, 2,4,7,9-, Butoxyethanol,2- from Air Products & Chemicals, Allentown, Pennsylvania) |
| Tetramethyl-5-decyne-4,7-diol,2,4,7,9-, Butoxyethanol, 2- Alkylarylalkoxylate | SURFYNOL CT-136 ™ (a proprietary dispersant containing Poly(oxy-1,2-ethandiyl,a-(nonylphenyl)-w-hydroxy and Tetramethyl-5-decyne-4,7-diol, 2,4,7,9-, Butoxyethanol,2- from Air Products |

| Chemistry | Trade Name |
|---|---|
| | & Chemicals) |
| Ester/Styrene Maleic Anhydride Copolymer | |
| Ethylene Glycol | |
| Tetramethyl-5-decyne-4,7-diol,2,4,7,9-, | |
| Butoxyethanol, 2- | |
| Alkylethoxylates | EMULSOGEN LCN 287 ™ (a propriety alkyl ether carboxylic acid from Clariant, Frankfurt, Germany) |
| Alkylethersulfates | EMULSOGEN LCN 073 ™ (a propriety alkyl ether carboxylic acid from Clariant) |
| Alkyletherphosphoric Acid Esters | HOSTAPHAT 1306 ™ & HOSTAPHAT OPS ™ (a propriety alkyl ether carboxylic acid from Clariant) |
| Polyarylalkylphenolethoxylates and Phosphate Esters | EMULSOGEN TS 200 ™ & DISPERSOGEN LFH ™ (a proprietary alkyl ether carboxylic acid and a compatibilizer respectively from Clariant) |
| Castor Oil Polyoxyethylene Sulfosuccinic Acid Esters | DISPERSOGEN 4387 ™ (a proprietary compatibilizer from Clariant) |
| Ethylene Oxide/Propylene Oxide Block Copolymer | PLURONIC ™ ( proprietary triblock copolymer from BASF, Ludwigshafen, Germany) |
| Sodium salts of naphthalenesulphonic acis condensation | TAMOL ™ (a hydrophilic copolymer from Dow Chemical, Phildelphia, Pennsylvania) |
| Diethylethanolamine | SOKALAN HP 165 K ™ (a proprietary polycarboxylate from BASF) |
| High molecular weight carboxylic acid salt with an alkyl ammonium | RHEOFLOW DS-330 ™ (proprietary polyester from K.S. Chemical Co., Ltd., Ulsan, Korea) |
| Lower molecular weight unsaturated polycarboxylic acid polymer | RHEOFLOW DS-104 ™ ( a proprietary polyester from K.S. Chemical Co., Ltd.) |

Syrfynol CT-131 (136) are both commercially available from Air Products & Chemicals Inc.; Emulsogen LCN 287, Emulsogen EPA 073, Emulsogen TS 200, Hostaphat 1306, Hostaphat OPS, Dispersogen LFH, and Dispersogen 4387 are all commercially available from Clariant, Industrial Performance Chemicals; Pluronic, Tamol, and Solkalan HP 165 K are available from BASF-The Chemical Company; and Rheoflow DS-330 and Rheoflow DS-104 are available from KS Chemical Co., LTD.

The dispersant may further comprise an acetylenic diol surfactant, an alkylarylalkoxylate, an alkylethoxylate, an alkylethersulfate, an alkyletherphosphoric acid ester, a polyarylalkylphenolethoxylate, a castor oil polyoxyethylene sulfosuccinic acid ester; an ethylene oxide/propylene oxide block copolymer; a sodium salt of naphthalenesulphonic acid condensation; a diethylethanolamine; a high molecular weight carboxylic acid salt with an alkyl ammonium; or an unsaturated polycarboxylic acid polymer.

When present, the dispersant may be combined with the solvent and the polyvinyl alcohol particles in an amount from about 0.2% to about 3.0% by weight.

Of particular advantage, it has been found that when a dispersant is used, higher molecular weight polyvinyl alcohol polymers and polyvinyl alcohol polymers having a higher degree of hydrolysis can be more rapidly dissolved in the solvent. For instance, when a polymer is selected that has a degree of hydrolysis of greater than 90 mole percent, such as even greater than 96 mole percent, the dispersant can aid in dissolving the polymer in the solvent in a relatively short period of time and without having to supply any external heat to the process.

The process as described above for producing a polyvinyl alcohol solution can provide tremendous cost savings and other benefits and advantages not only for manufacturers of the polyvinyl alcohol polymer but also for manufacturing facilities that use the polymers in their processes. For example, through the process of the present disclosure, polyvinyl alcohol can be supplied to a manufacturing site in a solid form. Transportation and freight costs are greatly reduced in that none of the solvent is actually transported with the polymer particles. The solid particles are also much easier to package and transport in comparison to having to transport a liquid solution. For instance, through the process of the present disclosure, large totes containing a polyvinyl alcohol solution need not be used to ship polymer solutions that, when emptied, would need to be returned to the polyvinyl alcohol supplier.

In addition, since no external heat is needed in order to create the polyvinyl alcohol solution, the energy requirements needed to incorporate the polyvinyl alcohol additive into a product are also reduced. In addition, the polyvinyl alcohol solution can be formed directly at a manufacturing facility. Thus, the polyvinyl alcohol solution can be formulated close in time to when the additive is needed in a process. Consequently, the solution is not stored for any extended periods of time during which settling may occur or the solution may be otherwise contaminated.

In still another embodiment of the present disclosure, it may not be necessary to first dissolve the polyvinyl alcohol particles prior to incorporation into a useful product. In one embodiment, for instance, the polyvinyl alcohol particles can be directly incorporated into a product while the product is being formed.

In one particular embodiment, for instance, the present disclosure is directed to a process for formulating a starch adhesive in which polyvinyl alcohol particles are directly added to the adhesive composition as it is being formed.

In this embodiment, for instance, initially starch and a solvent, such as water, are mixed and heated to a temperature and for a time sufficient for at least a portion of the starch to gelatinize. The initial mixture is also combined with a boron compound, such as a boric acid or a borax. Optionally, the initial mixture can also contain a base, such as sodium hydroxide.

In one embodiment, the above mixture is heated to a temperature of from about 90° F. to about 120° F., such as from about 100° F. to about 110° F. The mixture can be heated while it is also being agitated or mixed.

The above components are mixed together until a homogenous pre-adhesive composition is formed. More particularly, once the boron compound, such as borax, has been homogenously mixed with the pre-adhesive composition, the polyvinyl alcohol particles in accordance with the present disclosure are combined with the composition. If the polyvinyl alcohol particles are added too early, the particles may react with the boron compound and form clumps or undesirable byproducts. The polyvinyl alcohol particles are added with the pre-adhesive composition in an amount from about 0.5% to about 5% by weight, such as from about 0.5% to about 2.5% by weight. Once added, the polyvinyl alcohol particles are homogenously mixed with the pre-adhesive composition and are heated and/or mixed sufficiently so that the particles dissolve within the composition.

In one embodiment, the polyvinyl alcohol particles and the pre-adhesive composition are mixed under high shear conditions with or without heat until the polyvinyl alcohol particles dissolve. In one particular embodiment, the composition is mixed under high shear conditions while also being heated to temperatures as described above, such as from about 90° F. to about 120° F.

In order to form the starch adhesive, a second quantity of starch may then be added to the composition. The second quantity of starch can be added simultaneously with the polyvinyl alcohol particles or may be added after the polyvinyl alcohol particles have dissolved. The second quantity of starch that is added to the composition is added and dispersed throughout the composition. The second quantity of starch may be dispersed throughout the composition without gelatinizing or only partially gelatinizing.

The polyvinyl alcohol particles added to the starch adhesive can comprise any suitable polymer capable of dissolving within the composition. In one embodiment, for instance, a polyvinyl alcohol polymer is used that is partially hydrolyzed. For instance, the polymer may have a degree of hydrolysis of from about 70 mole percent to about 90 mole percent, such as from about 84 mole percent to about 89 mole percent.

The starch material that is used to form the adhesive can comprise any suitable starch. The starch can be obtained, for instance, from roots, stems or fruits of various plant sources. Starch is a high molecular weight polymeric carbohydrate polysaccharide most commonly composed of six carbon monosaccharide units joined by alpha-glycan linkages. The starch can be, for instance, corn starch, tapioca starch, rice starch, potato starch, wheat starch, sago starch, and mixtures thereof. Starch milk and various other starches may also be used.

As described above, in one embodiment, the starch adhesive is made by first at least partially gelatinizing a first starch and then later adding a second starch. The first and second starch can be the same or different.

In addition to the above ingredients, the starch adhesive may contain various other components. For instance, the starch adhesive may include wetting agents, proteins, plasticizers, cross-linking resins, solubilizing agents, insolubilizing agents, rheology modifiers, water conditioners, penetrants, peptizers such as urea, gelatinization temperature modifiers, inert fillers such as clay, thickeners, and the like.

The total solid content of the starch adhesive composition may range from 10% to about 50%, such as from about 25% to about 40%.

Once prepared, the starch adhesive can be used in various applications, such as during the construction of corrugated boards.

The present disclosure may be better understood with reference to the following example.

EXAMPLE

As described above, in one embodiment of the present disclosure, polyvinyl alcohol particles are dissolved in water without the use of external heat. The following example demonstrates some of the features and aspects of this process.

In this example, the general method used to dissolve polyvinyl alcohol (PVOH) involved mixing polyvinyl alcohol and water. The PVOH was added to the water while the liquid was agitated with a high shear mixer. No external heat was added to the mixture during the process though the temperature increased slightly due to the intensive mixing. Optionally, a defoamer, a dispersant, prilled urea, or any combination thereof was added to the mixture as well. Each sample was mixed in the same manner, and the data for individual samples (1-38) can be found in the tables below.

In the samples below the following polyvinyl alcohol products were used. The following polyvinyl alcohol products are commercially available from the Celanese Corporation of Dallas, Tex.

| | | |
|---|---|---|
| C103 | Particle size- | 10-45% retained on 20 mesh |
| | | 50-85% retained on 40 mesh |
| | % Hydrolysis- | 98.0-98.8 |
| | Viscosity- | 3.5-4.5 |
| C107 | Particle size- | 10-45% retained on 20 mesh |
| | | 50-85% retained on 40 mesh |
| | % Hydrolysis- | 98.0-98.8 |
| | Viscosity- | 5.5-6.6 |
| C165SF- | Particle size- | 0.1% maximum retained on 80 mesh |
| | | 1.0% maximum retained on 120 mesh |
| | % Hydrolysis- | 99.3+ |
| | Viscosity- | 62-72 |
| C203 | Particle size- | 60-75% retained on 40 mesh |
| | | 85-90% retained on 20 mesh |
| | % Hydrolysis- | 87.0-89.0 |
| | Viscosity- | 3.5-4.5 |
| C203S | Particle size- | 0.1% maximum retained on 40 mesh |
| | | 1.0% maximum retained on 80 mesh |
| | % Hydrolysis- | 87.0-89.0 |
| | Viscosity- | 3.5-4.5 |
| C205S | Particle size- | 0.1% maximum retained on 40 mesh |
| | | 1.0% maximum retained on 80 mesh |
| | % Hydrolysis- | 87.0-89.0 |
| | Viscosity- | 5.2-6.2 |
| C418 | Particle size- | 35-70% retained on 20 mesh |
| | | 80-98% retained on 40 mesh |
| | % Hydrolysis- | 91.0-93.0 |
| | Viscosity- | 14.5-19.5 |
| C502 | Particle size- | 60-75% retained on 40 mesh |
| | | 85-90% retained on 20 mesh |
| | % Hydrolysis- | 87.0-89.0 |
| | Viscosity- | 3.0-3.7 |
| C805S- | Particle size- | 0.1% maximum retained on 40 mesh |
| | | 1.0% maximum retained on 80 mesh |
| | % Hydrolysis- | 87.0-89.0 |
| | Viscosity- | 5.2-6.2 |

The polyvinyl alcohol products detailed above have particle sizes dependent on the type of mesh wire cloth used. The specifications for each type of mesh used are as follows:

20 mesh has a wire diameter between 0.009-0.028 inches, a width of opening between 0.410-0.220 inches, and a percent of open area between 67.2-19.4% respectively.

40 mesh has a wire diameter between 0.008-0.013 inches, a width of opening between 0.0170-0.0120 inches, and a percent of open area between 46.2-23.0% respectively.

80 mesh has a wire diameter between 0.0055-0.007 inches, a width of opening between 0.0070-0.0055 inches, and a percent of open area between 31.4-19.4% respectively. 120 mesh has a wire diameter between 0.0037-0.0040 inches, a width of opening between 0.0046-0.0043 inches, and a percent of open area between 30.7-26.8% respectively.

TABLE 1

| Sample No. | PVOH | Target Total Solids | Targeted Solution Volume L | Defoamer Type | Dispersant Type |
|---|---|---|---|---|---|
| 1 | C203S | 15% | | None | None |
| 2 | C805S | 15% | | None | None |
| 3 | C805S | 21% | | None | None |
| 4 | C203S | 35% | 1.0 | None | None |
| 5 | C203S | 35% | 1.0 | None | None |
| 6 | C203S | 35% | 1.0 | None | None |
| 7 | C203S | 35% | 1.0 | HL-36 | None |
| 8 | C203S | 17% | 1.0 | None | None |
| 9 | C203S | 17% | 1.0 | HL-36 | None |
| 10 | C165S F | 7% | 1.0 | None | None |
| 11 | C165S F | 7% | 1.0 | HL-36 | None |
| 12 | C203S | 17% | 1.0 | None | None |
| 13 | C203S | 17% | 1.5 | None | None |
| 14 | C203S | 17% | 1.5 | HL-36 | None |
| 15 | C203S | 17% | 1.5 | Harcros Antifoam 116 | None |
| 16 | C203S | 45% | 2.0 | HL-36 | None |
| 17 | C203S | 21.25% | 1.5 | None | None |
| 18 | C203S | 21.25% | 1.5 | None | None |
| 19 | C203 | 17% | 1.5 | None | None |
| 20 | C203S | 35% | 1.5 | HL-36 | None |
| 21 | C203S | 38% | 1.5 | HL-36 | None |
| 22 | C205S | 35% | 1.5 | HL-36 | None |
| 23 | C205S | 30% | 1.5 | HL-36 | None |
| 24 | C205S | 30% | 1.5 | HL-36 | None |
| 25 | C203S | 41.80% | 1.5 | HL-36 | None |
| 26 | C203S | 38.50% | 1.5 | HL-36 | None |
| 27 | C502 | 38% | 1.5 | HL-36 | None |
| 28 | C502 | 42% | 2.0 | HL-36 | None |
| 29 | C203S | 35% | 1.5 | HL-36 | None |
| 30 | C203S | 30% | 1.5 | HL-36 | None |
| 31 | C203S | 30% | 1.5 | HL-36 | None |
| 32 | C203 | 17% | 1.0 | None | Surfynol CT-131 |
| 33 | C203 | 17% | 1.0 | None | None |
| 34 | C203 | 35% | 1.5 | None | None |
| 35 | C107 | 22% | 1.5 | None | None |
| 36 | C418, C165S F | 12% | 1.5 | None | None |
| 37 | C103 | 20% | 1.5 | None | None |
| 38 | C103 | 22% | 1.5 | None | None |

TABLE 2

Amount of Each Component in Mixture

| Sample No. | PVOH g | H$_2$O g | Prilled Urea Pre-Addn g | Defoamer g | Dispersant g |
|---|---|---|---|---|---|
| 1 | 51.00 | 300.00 | 0.00 | 0.00 | 0.00 |
| 2 | 51.00 | 300.00 | 0.00 | 0.00 | 0.00 |
| 3 | 65.00 | 240.00 | 0.00 | 0.00 | 0.00 |
| 4 | 349.63 | 646.04 | 0.00 | 0.00 | 0.00 |
| 5 | 349.63 | 646.04 | 0.00 | 0.00 | 0.00 |
| 6 | 349.34 | 646.40 | 0.00 | 0.00 | 0.00 |
| 7 | 352.08 | 649.22 | 0.00 | 0.35 | 0.00 |
| 8 | 172.37 | 832.84 | 0.00 | 0.00 | 0.00 |
| 9 | 171.21 | 831.57 | 0.00 | 0.16 | 0.00 |
| 10 | 69.66 | 929.85 | 0.00 | 0.00 | 0.00 |
| 11 | 70.85 | 929.27 | 0.00 | 0.07 | 0.00 |
| 12 | 172.02 | 829.96 | 0.00 | 0.00 | 0.00 |
| 13 | 255.32 | 1243.55 | 0.00 | 0.00 | 0.00 |
| 14 | 256.38 | 1245.56 | 0.00 | 0.78 | 0.00 |
| 15 | 254.78 | 1244.20 | 0.00 | 0.77 | 0.00 |
| 16 | 918.93 | 1102.36 | 0.00 | 1.01 | 0.00 |
| 17 | 262.40 | 1181.24 | 56.25 | 0.00 | 0.00 |
| 18 | 262.46 | 1181.86 | 56.20 | 0.00 | 0.00 |
| 19 | 255.47 | 1245.07 | 0.00 | 0.00 | 0.00 |
| 20 | 525.04 | 972.37 | 0.00 | 2.63 | 0.00 |
| 21 | 569.95 | 927.16 | 0.00 | 2.85 | 0.00 |
| 22 | 534.98 | 962.37 | 0.00 | 2.62 | 0.00 |
| 23 | 449.96 | 1049.28 | 0.00 | 0.76 | 0.00 |
| 24 | 450.70 | 1049.25 | 0.00 | 0.80 | 0.00 |
| 25 | 570.04 | 873.00 | 56.98 | 0.86 | 0.00 |
| 26 | 524.98 | 922.15 | 52.51 | 0.80 | 0.00 |
| 27 | 570.52 | 922.50 | 0.00 | 0.75 | 0.00 |
| 28 | 840.80 | 1160.12 | 0.00 | 1.00 | 0.00 |
| 29 | 524.77 | 825.05 | 0.00 | 0.73 | 0.00 |
| 30 | 450.28 | 1049.50 | 0.00 | 0.77 | 0.00 |
| 31 | 449.99 | 1049.34 | 0.00 | 0.80 | 0.00 |
| 32 | 174.12 | 825.86 | 0.00 | 0.00 | 3.40 |
| 33 | 171.70 | 828.51 | 0.00 | 0.00 | 0.00 |
| 34 | 525.18 | 975.00 | 0.00 | 0.00 | 0.00 |
| 35 | 333.42 | 1170.68 | 0.00 | 0.00 | 0.00 |
| 36 | 182.75 | 1322.41 | 0.00 | 0.00 | 0.00 |
| 37 | 305.47 | 1200.86 | 0.00 | 0.00 | 0.00 |
| 38 | 330.52 | 1169.89 | 0.00 | 0.00 | 0.00 |

TABLE 3

| Sample No. | Total Mix Time min | Mix RPM rpm | Mixer | Initial Soln Temp °C. | Final Soln Temp °C. | PVOH Solids Based Upon Initial Weights |
|---|---|---|---|---|---|---|
| 1 | 15 | unknown | Cowles | | 18.3 | 14.53 |
| 2 | 15 | unknown | Cowles | | 29.4 | 14.53 |
| 3 | 15 | unknown | Cowles | | 26.7 | 21.31 |
| 4 | 13 | 4200, 5900, 5400 | S L4RT-W* | | 38.3 | 35.12 |
| 5 | 18 | 5500 | S L4RT-W | | 44.1 | 35.12 |
| 6 | 13 | 6200 | S L4RT-W | | 50.0 | 35.08 |
| 7 | 13 | 6200 | S L4RT-W | | 58.3 | 35.16 |
| 8 | 5 | 5200 | S L4RT-W | | 23.7 | 17.15 |
| 9 | 5 | 5200 | S L4RT-W | | 24.2 | 17.07 |
| 10 | 5 | 2600 | S L4RT-W | | 22.1 | 6.97 |
| 11 | 5 | 2600 | S L4RT-W | | 23.5 | 7.08 |
| 12 | 5 | 5200 | S L4RT-W | | 24.5 | 17.17 |
| 13 | 5 | 5200 | S L4RT-W | | 22.0 | 17.03 |
| 14 | 5 | 5200 | S L4RT-W | | 22.6 | 17.07 |
| 15 | 5 | 5200 | S L4RT-W | | 22.9 | 17.00 |
| 16 | 21 | 4000, 5400, 6000 | S L4RT-W | | 40.0 | 45.46 |
| 17 | 5 | 5200 | S L4RT-W | | 21.2 | 17.49 |
| 18 | 6 | 5200 | S L4RT-W | 21.3 | 21.8 | 17.49 |
| 19 | 20 | 2200 to 5200 | S L4RT-W | 21.1 | 26.5 | 17.03 |
| 20 | 13 | 2000 to 6200 | S L4RT-W | 21.8 | 45.2 | 35.06 |
| 21 | 13 | 2800 to 6300 | S L4RT-W | 19.7 | 49.3 | 38.07 |
| 22 | 13 | 2000 to 6200 | S L4RT-W | 20.4 | 47.9 | 35.73 |
| 23 | 13 | 2100 to 6200 | S L4RT-W | 20.8 | 39.0 | 30.01 |
| 24 | 13 | 2000 to 6200 | S L4RT-W | 20.8 | 47.0 | 30.05 |
| 25 | 14 | 6200 | S L4RT-W | 19.0 | 44.0 | 38.00 |
| 26 | 14 | 1500 to 6200 | S L4RT-W | 19.2 | 39.7 | 35.01 |
| 27 | 21 | 5200 to 7000 | S L4RT-W | 19.6 | 64.8 | 38.21 |
| 28 | 23 | 3400 to 7000 | S L4RT-W | 20.2 | 60.3 | 42.02 |
| 29 | 17 | 2500 to 6200 | S L4RT-W | | 44.9 | 38.88 |

TABLE 3-continued

| Sample No. | Total Mix Time min | Mix RPM rpm | Mixer | Initial Soln Temp °C. | Final Soln Temp °C. | PVOH Solids Based Upon Initial Weights |
|---|---|---|---|---|---|---|
| 30 | 16 | 2800 to 6300 | S L4RT-W | 20.1 | 41.8 | 30.02 |
| 31 | 17 | 2300 to 6600 | S L4RT-W |  | 44.4 | 30.01 |
| 32 | 27 | 1800 to 5200 | S L4RT-W | 21.6 | 36.1 | 17.41 |
| 33 | 28 | 2700 to 6400 | S L4RT-W | 20.4 | 36.0 | 17.17 |
| 34 | 28 | 2700 to 6400 | S L4RT-W | 20.3 | 62.4 | 35.01 |
| 35 | 95 | 2800 to 8000 | S L4RT-W | 22.4 | 72.1 | 22.17 |
| 36 | 95 | 2500 to 8000 | S L4RT-W | 20.9 | 52.2 | 12.14 |
| 37 | 107 | 2100 to 7200 | S L4RT-W | 22.2 | 52.5 | 20.28 |
| 38 | 184 | 2000 to 7600 | S L4RT-W | 20.7 | 64.1 | 22.03 |

*S L4RT-W: Silverson L4RT-W Mixer

In all of the samples above, the polyvinyl alcohol particles were substantially completely dissolved in water without the use of external heat. As shown above, for most samples, the total mix time was less than about 30 minutes.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the disclosure so further described in such appended claims.

What is claimed:

1. A process for dissolving a polyvinyl alcohol into an aqueous medium comprising:
combining a mixture of a solvent comprising water said solvent having an initial temperature of less than about 180° F., with a polyvinyl alcohol and a dispersant, the polyvinyl alcohol being in the form of solid particles, the dispersant comprising an acetylenic diol surfactant, an alkylarylalkoxylate, an alkylethoxylate, an alkylethersulfate, an alkyletherphosphoric acid ester, a polyarylalkylphenolethoxylate, a castor oil polyoxyethylene sulfosuccinic acid ester; an ethylene oxide/propylene oxide block copolymer; a sodium salt of naphthalenesulphonic acid; a diethylethanolamine; a carboxylic acid salt with an alkyl ammonium; or an unsaturated polycarboxylic acid polymer, wherein the mixture consists essentially of the solvent, the polyvinyl alcohol and the dispersant;
mixing the solvent, the polyvinyl alcohol, and the dispersant without adding any external heat in a high shear device using a shear rate of at least 100 sec$^{-1}$ to form an aqueous polyvinyl alcohol solution such that the resulting solution has a final temperature of less than about 200° F. and the polyvinyl alcohol is substantially completely dissolved such that no more than 5% by weight of undissolved polyvinyl alcohol solids are present in the resulting solution.

2. The process as defined in claim 1, wherein the polyvinyl alcohol solution contains polyvinyl alcohol in an amount equal or less than 60 percent by weight.

3. The process as defined in claim 1, wherein the polyvinyl alcohol is greater than about 70 mole percent hydrolyzed.

4. The process as defined in claim 1, wherein the polyvinyl alcohol comprises granules having a particle size less than 2,500 microns.

5. The process as defined in claim 1, wherein the polyvinyl alcohol comprises a powder having an average particle size of less than about 800 microns.

6. The process as defined in claim 1, wherein the polyvinyl alcohol is from about 60 mole percent to about 99.3+ mole percent hydrolyzed.

7. The process as defined in claim 1, wherein the polyvinyl alcohol has a viscosity at 4 percent solids and at 20° C. of less than about 75 cps.

8. The process as defined in claim 7, wherein the polyvinyl alcohol solution contains polyvinyl alcohol in an amount equal to or less than 60 percent by weight.

9. The process as defined in claim 1, wherein the polyvinyl alcohol solution contains polyvinyl alcohol in an amount from about 20 percent to about 30 percent by weight.

10. The process as defined in claim 1, wherein the solvent and solid particles are mixed by being recirculated with the high shear device.

11. The process as defined in claim 1, wherein the solvent and solid particles are mixed in the high shear device using a shear rate of at least 500 sec$^{-1}$.

12. The process as defined in claim 1, wherein the solvent and solid particles are mixed in the high shear device using a shear rate of at least 1,000 sec$^{-1}$.

13. The process as defined in claim 1, wherein the solvent and solid particles are mixed in the high shear device using a shear rate of at least 1,500 sec$^{-1}$.

14. The process as defined in claim 1, wherein the solvent and solid particles are mixed in the high shear device using a shear rate of at least 2,000 sec$^{-1}$.

15. The process as defined in claim 1, wherein the solvent and solid particles are batch mixed.

16. The process as defined in claim 15, wherein the solvent has an initial temperature of less than about 110° F. and the resulting polyvinyl alcohol solution has a final temperature after batch mixing of less than about 150° F.

17. The process as defined in claim 16, wherein the solvent has an initial temperature of less than about 80° F. and the resulting polyvinyl alcohol solution has a final temperature after batch mixing of less than about 110° F.

18. The process as defined in claim 1, wherein the high shear device includes an impeller that rotates at a rate of 1,500 to 20,000 rpm during mixing.

19. The process as defined in claim 1, wherein the solvent and solid particles are batch mixed for less than about 500 minutes.

20. The process as defined in claim 1, wherein the solvent and solid particles are mixed for less than about 30 minutes.

21. The process as defined in claim 1, wherein the solvent and solid particles are mixed for less than about 15 minutes.

22. The process as defined in claim 1, wherein the solvent and solid particles are batch mixed by being pumped into and out of a mixing tank.

23. The process as defined in claim 1, wherein the high shear device is a centrifugal pump with an impeller operated at a speed of greater than 1,200 rpm.

24. The process as defined in claim 1, wherein the high shear device is a centrifugal pump with an impeller operated at a speed of greater than 1,500 rpm.

25. The process as defined in claim 1, wherein the high shear device is a centrifugal pump with an impeller operated at a speed of greater than 1,700 rpm.

26. The process as defined in claim 1, wherein the high shear device is a centrifugal pump with an impeller operated at a speed of from 1,200 rpm up to 20,000 rpm.

27. The process as defined in claim 1, wherein the high shear device is a high shear mixer with a rotor operated at a speed of from 1,000 rpm to 10,000 rpm.

28. The process as defined in claim 1, wherein the high shear device is a high shear mixer with a rotor operated at a speed of from 1,200 rpm to 4,000 rpm.

29. The process as defined in claim 1, wherein the solvent and solid particles are mixed together for less than about 10 minutes in order to dissolve substantially all of the polyvinyl alcohol.

30. The process as defined in claim 1, wherein the polyvinyl alcohol is greater than 90 mole percent hydrolyzed.

31. The process as defined in claim 1, wherein the polyvinyl alcohol is from about 91 mole percent to about 99.3+ mole percent hydrolyzed.

32. The process as defined in claim 1, wherein the polyvinyl alcohol is from about 96 mole percent to about 99.3+ mole percent hydrolyzed.

* * * * *